Patented Jan. 25, 1949

2,459,896

UNITED STATES PATENT OFFICE 2,459,896

SILVER IMPREGNATION

George Schwarz, Williamstown, Mass.

No Drawing. Application January 18, 1945,
Serial No. 573,465

5 Claims. (Cl. 117—138.5)

1

This invention relates to compositions containing silver and to a process for producing such compositions. It relates more specifically to a method of depositing silver in a highly reactive form on suitable carriers and to the products obtained by this method.

It is an object of the invention to provide a method whereby silver is deposited on fibrous materials capable of swelling or on porous materials or on finely divided particles.

It is a further object of the invention to provide such silver deposits in a highly reactive form, particularly in a colloidal or highly dispersed form on or in a large-surface material.

It is another object of the invention to provide silver impregnations of high adhesion and of deep penetration into the carrier.

Compositions containing such highly dispersed silver can be used for various purposes in various arts according to their particular composition or preparation and to the kind of carrier on or in which the silver has been deposited. Silver impregnated cotton, according to the present invention, is a useful material for antiseptic bandages. Pumice or silica gel, containing silver in accordance with the present method, is a useful catalyst for various chemical reactions. Colloidal kaoline treated according to the present invention can be used after dehydration as an antiseptic addition to dusting powders or to tooth powder. Sand treated according to the present invention provides a valuable filtering medium, exerting a higher bactericidal activity than previously obtainable similar compositions.

Compositions containing highly reactive silver, are obtainable according to the present invention by causing a complex silver amine compound to react in the presence of a material capable of swelling or a porous material or a highly dispersed material with a hydroxyalkyl compound containing one or more basic nitrogen substituents, such as represented by the group of the aminoalcohols and their derivatives.

Prior to the present invention it has been suggested to deposit silver on various carriers by the methods used in the production of silver mirrors (Brashear's process), Rochelle salt process. No highly reactive silver deposits, especially no colloidal silver deposits are obtainable by these processes, when used in the impregnation of fibres capable of swelling or of porous or finely divided materials.

It has now been found that amino-alcohols produce highly reactive or highly dispersed colloidal silver when heated in the presence of

2 large-surface bodies, such as fibers, and more especially organic fibers or on porous materials and materials in highly divided form. The silver combines not only with the surface of these materials in a particularly reactive form, but also penetrates into the material if the material is capable of swelling. Highly valuable products can be obtained if the process is carried out in the presence of organic swelling agents, particularly in the case of fibres which have only a limited capacity of swelling in water.

The alkylolamines, which can be used according to my invention for obtaining highly reactive silver deposits, are, the higher alkylolamines and such alkylolamines as contain more than one basic nitrogen group.

As compounds, suitable for use in the present process, there may, for instance, be named:

2-amino-2-methyl-1,3-propanediol
2-amino-2-methyl-propanol
$\beta$-Diethylamino-propylalcohol
$\gamma$-Diethylamino-propylalcohol
N,$\beta$-hydroxyethylaniline
N,-di-($\beta$-hydroxyethyl)-aniline
Trimethylolaminomethane
Triisoproanolamine
N,$\beta$-$\gamma$-dihydroxypropyl-di-($\beta$-hydroxyethyl) amine
n-Butyl-diethanolamine
n-Butyl-monoethanolamine
n-Octyl-diethanolamine
N,$\beta$-hydroxyethyl-morpholine
Hydroxyethyl-ethylenediamine
Hydroxyethyl diethylene triamine
Hydroxypropyl ethylenediamine
1-3-diamino-iso-propyl alcohol
N-acetyl-N'-hydroxyethylenediamine
2-amino-5-methyl-hydroxyethyl-thiazolium chloride
2-amino-N-hydroxyethyl pyridinium chloride
N-lauryl-hydroxyethyl piperidinium chloride
4-di-($\beta$-hydroxyethyl)-aminophenol
2-aminoglucose
1-aminofructose All these alkylolamines may be used singly or in mixture with each other. Other amines such as for instance morpholine, pyridine, diethyl- or triethyl amine may be present or may be used in the preparation of the complex silver solution used in this process. Ammonia can also be used. Other reducing agents, for instance hydroquinone, paraphenylendiamine, hydrazine or hydroxylamines can also be used, provided the reduction is started by an alkylolamine, since only the alkylolamines deposit silver in a highly disperse state. The silver solution used in this process can be prepared with silvernitrate, silver oxalate, silver lactate, etc., all of which are capable of forming complex silver amine solutions.

The reaction is best carried out in water. Organic solvents can be added however, in order to facilitate swelling of materials such as plastics, fibres made of plastics, bristles, etc.

The proportion of the various reaction components is widely variable provided the amount of amine is sufficient to form a soluble silver amine complex. The reaction is carried out under heating, boiling or refluxing, in some cases under radiation with wavelengths capable of forming silver specks, such as blue, violet, ultraviolet or X- and gamma-rays. The silver amine complex can be formed before or after irradiation.

The following examples will serve to illustrate some methods of preparing products embodying the principles of this invention without being restricted thereto:

Example 1

1 kg. of cotton is soaked in a solution containing in 25 liters water, 10 g. silver nitrate and 20 g. aminoethanol. After one hour the mixture is heated to boiling temperature and continuously kept moving to insure a uniform product. Boiling is continued 10 minutes, the cotton is then withdrawn from the reaction mixture, squeezed or subjected to centrifugal action, washed with water and dried.

The resulting product contains highly dispersed colloidal silver, of a pleasant yellow color, exerting to a very high degree the well known bactericidal effect of colloidal silver preparations. It can be used for antiseptic bandages, for germicidal filtration of drinking water, etc. A similar product is obtained if aminoethanol is replaced by diethanolamine or triethanolamine.

Example 2

Gauze, suitable for bandages, is impregnated with a solution containing in 1 liter water 10 g. silver oxide and 10 g. 2-amino-2-methyl-propanol. The soaked gauze is subjected to the radiation of heat radiant lamps in a moist atmosphere whereupon the silver is reduced in a highly dispersed form. The gauze is then washed with water and dried. The gauze thus obtained is suitable for highly bactericidal bandages. The 2-amino-2-methyl-propanol can be replaced by 2-amino-2-methyl-1,3-propanediol or by tri-isopropanolamine.

Example 3

Gauze is first impregnated with a 10% solution of silver nitrate and then with a 5% solution of sodium chloride and 0.5% potassium bromide. The gauze thus impregnated, containing water, silver chloride and silver bromide is exposed to the radiation of a mercury quartz lamp for about 20 seconds at a distance of one foot and in thus treated 5 minutes in a boiling solution of 10% diethanolamine. After washing with water and drying highly bactericidal bandage material is obtained.

Example 4

Gauze is impregnated with a solution containing 10% silver citrate and 1% silver nitrate and exposed to the radiation of a carbon arc lamp, while being treated 10 to 15 minutes with steam containing the vapors of 2-dimethyl-aminoethanol 10–15 minutes. After washing and drying, an excellent bandage material is obtained.

Example 5

1 kg. colloidal kaoline is introduced into 10 liters water containing 20 g. silver nitrate and 50 g. hydroxyethyl-ethylenediamine. The reaction mixture is heated under stirring and boiled 15 minutes. After centrifuging a bluish gray paste like material is obtained which is dried and pulverized. It can be admixed to dusting powders to which it imparts a highly germicidal and fungicidal character.

Example 6

1 kg. dry silica gel is placed in 10 liters water, containing 25 g. silver oxide and 25 g. aminoethanol. After boiling 10 minutes the silica gel is washed with water and dried. The silica-silver preparation thus obtained, is an effective catalyst for instance for the oxidation of ethanol to acetaldehyde in the vapor phase. In this example aminoethanol can be replaced by aminopropanol or by diethylaminoethanol or by mixtures thereof.

Example 7

1 kg. rayon fibres or fabric is soaked in a solution consisting 15 liters water, 10 liters acetone, 20 g. silver nitrate 10 g. triethanolamine and 10 g. 2-amino-2-methyl-propanol. After refluxing 10 minutes the solution is squeezed out and the product dried.

Example 8

1 kg. wool is boiled in a solution consisting 10 liters water, 50 g. silver nitrate and 50 g. ethyl diethanolamine. After centrifuging, washing and drying, the product has a pleasant yellow-brown color and is bacteriostatic.

Example 9

The silver cotton obtained according to example 1 is placed in a solution 10 g. silver nitrate, 10 g. ammonia water and 10 g. N,-beta-hydroxyethyl-morpholine in 1 liter water and gradually heated. The color becomes darker, as the amount of silver in the fibres increases. Under proper variation of the reaction time, the concentration of the solution and the ratio of cotton to silver, all color shades between yellow and black can be obtained.

Example 10

1 kg. bristles, made of a polyamide plastic known under the trade name of nylon, are placed in a solution containing 10 g. silver nitrate, 25 g. morpholine, 100 g. ethyleneglycolmonomethylether and 10 g. triethanolamine in 5 liters water. After soaking about 15 minutes the reaction mixture is heated and boiled 10 more minutes. The bristles are washed and dried. They can be used in the manufacture of brushes, for instance tooth brushes, the deposit of highly reactive silver rendering them self-sterilizing to a high degree.

Example 11

1 kg. paper pulp, containing essentially alpha cellulose is suspended in 10 liters water containing 25 g. silver oxide and 15 g. diethylaminoethanol. After heating to boiling point for a few minutes, the pulp is squeezed and washed. It can be used in the manufacture of sanitary handkerchiefs, towels, napkins, etc.

It will be noted that the alcohols listed above as examples of those which may be used, are all alcohols of relatively low molecular weight, all of the examples having not more than four carbon atoms in the alcohol radical and not more than twelve carbon atoms in any non-alcoholic radical.

As many apparently different embodiments of this invention may be made without departing from the spirit and scope thereof, it is to be understood that I do not limit myself to the specific examples given above.

I claim:

1. The method of producing on organic fibers a relatively permanent deposit of yellow highly dispersed colloidal silver, which comprises the steps of reducing, in contact with the organic fibers on which the deposit is to be produced, an aqueous solution of a silver compound providing silver ions, by reacting said solution with sufficient of an alkylolamine to effect such reduction.

2. The method of producing on nylon fibers a relatively permanent deposit of yellow highly dispersed colloidal silver, which comprises the steps of reducing, in contact with the nylon fibers on which the deposit is to be produced, an aqueous solution of a silver compound providing silver ions, by reacting said solution with sufficient of an alkylolamine to effect such reduction.

3. As a new product, an organic fiber having thereon a relatively permanent water-insoluble stable yellow deposit of highly dispersed colloidal silver formed by reducing, in contact with said organic fiber, an aqueous solution of a silver compound providing silver ions, by reacting said solution with sufficient of an alkylolamine to effect such reduction and deposit.

4. As a new product, a nylon fiber having thereon a relatively permanent deposit of highly dispersed colloidal silver formed by reducing, in contact with said nylon fiber, an aqueous solution of a silver compound providing silver ions, by reacting said solution with sufficient of an alkylolamine to effect such reduction and deposit.

5. The method in accordance with claim 1, in which the reaction is effected with the alkylolamine in vapor phase.

GEORGE SCHWARZ.

REFERENCES CITED

The following references are of record in the file of this patent:

UNITED STATES PATENTS

| Number | Name | Date |
|---|---|---|
| 1,642,089 | Schreier | Sept. 13, 1927 |
| 1,989,764 | Meltsner | Feb. 5, 1935 |
| 2,040,806 | Feigl | May 12, 1936 |
| 2,215,196 | Sch'ack | Sept. 17, 1940 |
| 2,283,883 | Conconi | May 19, 1942 |
| 2,315,141 | Tryon | Mar. 30, 1943 |

FOREIGN PATENTS

| Number | Country | Date |
|---|---|---|
| 180,973 | Great Britain | Nov. 21, 1922 |